US009738223B2

United States Patent
Zhang et al.

(10) Patent No.: US 9,738,223 B2
(45) Date of Patent: Aug. 22, 2017

(54) DYNAMIC GUIDELINE OVERLAY WITH IMAGE CROPPING

(75) Inventors: Wende Zhang, Troy, MI (US); Bakhtiar Brian Litkouhi, Washington, MI (US); Kent S. Lybecker, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 557 days.

(21) Appl. No.: 13/485,368

(22) Filed: May 31, 2012

(65) Prior Publication Data

US 2013/0321629 A1 Dec. 5, 2013

(51) Int. Cl.
| | | |
|---|---|---|
| *H04N 7/18* | (2006.01) |
| *B60R 1/00* | (2006.01) |
| *G06T 3/00* | (2006.01) |
| *H04N 17/00* | (2006.01) |
| *G06T 7/80* | (2017.01) |

(52) U.S. Cl.
CPC .............. *B60R 1/00* (2013.01); *G06T 3/00* (2013.01); *G06T 3/0068* (2013.01); *G06T 7/80* (2017.01); *H04N 17/002* (2013.01); *B60R 2300/302* (2013.01); *B60R 2300/305* (2013.01); *B60R 2300/306* (2013.01); *B60R 2300/406* (2013.01); *B60R 2300/50* (2013.01); *G06T 2207/10016* (2013.01); *G06T 2207/30252* (2013.01)

(58) Field of Classification Search
CPC .............. B60R 1/00; B60R 2300/302; B60R 2300/305; B60R 2300/306; B60R 2300/406; B60R 2300/50; G06T 2207/10016; G06T 2207/30252; G06T 3/00; G06T 3/0068; G06T 7/0018; H04N 17/002
USPC ...................................... 348/143; 382/103–104
See application file for complete search history.

(56) References Cited

U.S. PATENT DOCUMENTS

| | | | | |
|---|---|---|---|---|
| 7,184,073 | B2 * | 2/2007 | Varadarajan et al. | 348/148 |
| 2005/0168485 | A1 * | 8/2005 | Nattress | 345/632 |
| 2009/0010567 | A1 * | 1/2009 | Akiba et al. | 382/298 |
| 2009/0079828 | A1 * | 3/2009 | Lee et al. | 348/148 |
| 2012/0082346 | A1 * | 4/2012 | Katz et al. | 382/106 |
| 2012/0169875 | A1 * | 7/2012 | Matsukawa et al. | 348/148 |

(Continued)

FOREIGN PATENT DOCUMENTS

| | | | | |
|---|---|---|---|---|
| JP | 06233164 A | * | 8/1994 | H04N 5/232 |
| JP | 10257482 A | | 9/1998 | |

(Continued)

*Primary Examiner* — Jorge L Ortiz Criado
*Assistant Examiner* — Yong Joon Kwon

(57) ABSTRACT

A method for dynamically registering a graphic upon a cropped image obtained from a camera device includes capturing an original image obtained from the camera device. Intrinsic calibration information for the camera device, extrinsic information for the camera device and vehicle information are monitored. The cropped image is generated based on cropping parameters to exclude undesirable content from the original image. The intrinsic calibration information is adjusted based on a relationship to the cropping parameters. The graphic is dynamically registered upon the cropped image based on the adjusted intrinsic calibration information for the camera device, the monitored extrinsic information for the camera device and the monitored vehicle information.

21 Claims, 6 Drawing Sheets

(56) References Cited

U.S. PATENT DOCUMENTS

2012/0242803 A1* 9/2012 Tsuda et al. .................... 348/46
2012/0268641 A1* 10/2012 Kazama ................... 348/333.11
2013/0250114 A1* 9/2013 Lu ................................ 348/148
2013/0321629 A1* 12/2013 Zhang et al. ................. 348/148

FOREIGN PATENT DOCUMENTS

| JP | 2005293376 A | * | 10/2005 | ............... G08G 1/16 |
| JP | 2007329548 A | * | 12/2007 | |
| JP | 2008145364 A | * | 6/2008 | |
| JP | 2010237516 A | * | 10/2010 | |

* cited by examiner

DYNAMIC GUIDELINE OVERLAY WITH IMAGE CROPPING

TECHNICAL FIELD

This disclosure is related to vehicle vision systems.

BACKGROUND

The statements in this section merely provide background information related to the present disclosure. Accordingly, such statements are not intended to constitute an admission of prior art.

Modern vehicles may include one or more camera devices that provide, for example, back-up assistance, images of a roadway as the vehicle is traveling to represent roadway conditions and maneuvers, and images of display signs along the roadway or proximate to the roadway. For applications where graphics are overlaid on the camera images, it is critical to accurately calibrate focal length parameters and optical center parameters for the camera device. Cropping a camera image can result in the overlaid camera images being inaccurate if intrinsic calibration information such as focal length parameters and optical center parameters are not accurately calibrated or adjusted.

It is known, for example, to apply a calibration pattern or grid over a plurality of images requiring calibration. Calibration points are manually labeled with respect to the calibration pattern or grid over each of the images, especially for wide field-of-view cameras. Manually labeling calibration points is performed as a separate end-of-line camera calibration, or after market camera adjustment, resulting in a time-consuming camera calibration process.

It is desirable to provide a fast and reliable approach to enable a dynamic guideline overlay feature with image cropping functions on a camera device with minimal changes to an existing production system with respect to calibrating intrinsic calibration information for the camera device.

SUMMARY

A method for dynamically registering a graphic upon a cropped image obtained from a camera device includes capturing an original image obtained from the camera device. Intrinsic calibration information for the camera device, extrinsic information for the camera device and vehicle information are monitored. The cropped image is generated based on cropping parameters to exclude undesirable content from the original image. The intrinsic calibration information is adjusted based on a relationship to the cropping parameters. The graphic is dynamically registered upon the cropped image based on the adjusted intrinsic calibration information for the camera device, the monitored extrinsic information for the camera device and the monitored vehicle information.

BRIEF DESCRIPTION OF THE DRAWINGS

One or more embodiments will now be described, by way of example, with reference to the accompanying drawings, in which.

DETAILED DESCRIPTION

Figure 1:
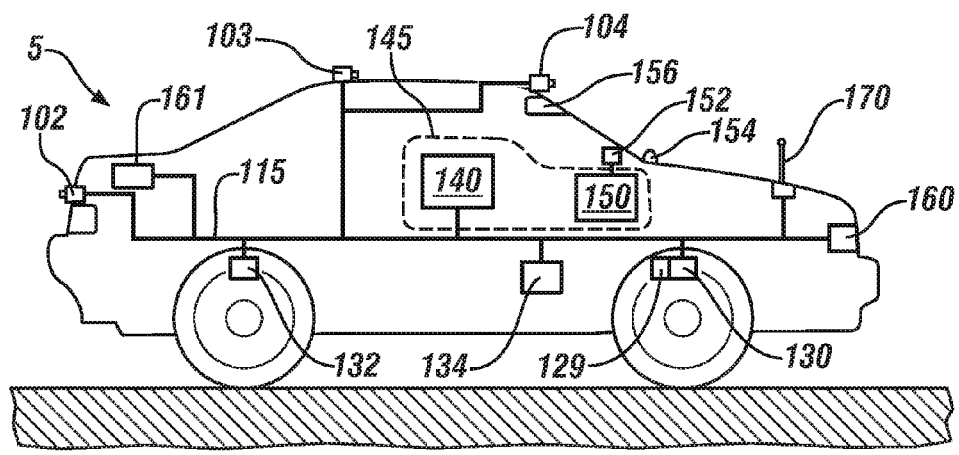
FIG. 1 illustrates an exemplary vehicle equipped with at least one camera device and a display system, in accordance with the present disclosure.

Referring now to the drawings, wherein the showings are for the purpose of illustrating certain exemplary embodiments only and not for the purpose of limiting the same, FIG. 1 illustrates an exemplary vehicle 5 equipped with at least one camera device and a display system 145, in accordance with the present disclosure. The at least one camera device can include a rearward camera device 102 proximate to the rear end of the vehicle 5 and configured to obtained rearward images having a point of view behind the vehicle. For instance, the rearward camera device 102 may be a wide field-of-view (FOV) camera device positioned proximate to a vehicle rear license plate. The at least one camera device can further include a frontward camera device 104 configured to obtain frontward images having a point of view in front of the vehicle. The at least one camera device can further include at least one side view camera device 103 configured to obtain side view images having a point of view to either or both sides of the vehicle. Hence, the camera device may include one or more of a rearward camera device 102, a frontward camera device 104, and a side-view camera device 103. It will be appreciated that the camera devices 102 and/or 104 can be adjustable to enable a wide range of point of views. The vehicle 5 further includes graphic projection displays, including, but not limited to, a display monitor 152 that can be separate are part of a human machine interface (HMI) device having a touch screen display, a side view mirror display 154 and a rearview mirror display 156. The vehicle 5 further includes first, second, and third detection device modules 160, 161, 170, respectively, for monitoring and analyzing informational inputs proximate to the vehicle to determine a feature of interest. The first detection device module 160 may include a frontward lidar device, a frontward laser device, a frontward radar device and a GPS device in conjunction with a 3D map database. The second detection device module 161 may include a rearward lidar device, a rearward laser device, and a rearward radar device. The third detection device module 170 may include a wireless communication receiver, a vehicle-to-vehicle information transceiver, a wireless communication transceiver and a vehicle-to-infrastructure information receiver. The vehicle further includes a plurality of vehicle information sensors, including a vehicle speed sensor 129, a frontward steering angle sensor 130, a rearward steering angle sensor 132 and a yaw rate sensor 134. The display system 145, discussed in greater detail below with reference to FIG. 5, includes a camera calibration module 140 and a graphic projection display module 150. The display system 145 includes a programmable processor including programming to monitor the rearward wide FOV camera device 102, the at least one side view camera device 103, the frontward camera device 104, the vehicle information sensors and the first, second and third detection device modules 160, 161, 170, respectively. For simplicity, only the rearward camera device 102 will be referred to herein unless otherwise specified. As will be discussed in greater detail, the display system 150 dynamically registers a graphic upon a cropped image based on adjusted intrinsic calibration information for the rearward camera device 102 and displays the cropped image and the dynamically registered graphic upon the cropped image upon the graphic projection display. The display system 145 can communicate directly with various systems and devices, or display system 145 can communicate over a LAN/CAN system 115. The lidar devices include devices known in the art that can measure the distance to, or other properties of information proximate to the vehicle, by illuminating the roadway information proximate to the vehicle with light. The radar devices include devices known in the art utilizing electromagnetic radiation to detect information proximate to the vehicle. The laser devices include devices known in the art that can measure the distance to information proximate to the vehicle, by using pulses of microwaves or radio waves projected to the target proximate to the vehicle. The vehicle-to-vehicle information transceiver can communicate with other vehicles on a roadway for monitoring information proximate to the vehicle. The vehicle-to-infrastructure receiver can receive monitored information transmitted from infrastructure transmitters located along a roadway. The vehicle speed sensor 129, frontward steering angle sensor 130, rearward steering angle sensor 132 and yaw rate sensor 134 are depicted to represent such vehicle information sensors representing vehicle operation, including vehicle motion parameters, but the disclosure intends to include any such sensors for use by the display system 145. The GPS device is a device known in the art for communicating with resources outside of the vehicle, for example, a satellite system. The GPS device may be utilized in conjunction with a 3D map database including detailed information relating to a global coordinate received by the GPS device regarding the current location of the vehicle and tracking previously traversed GPS information.

Figure 2:
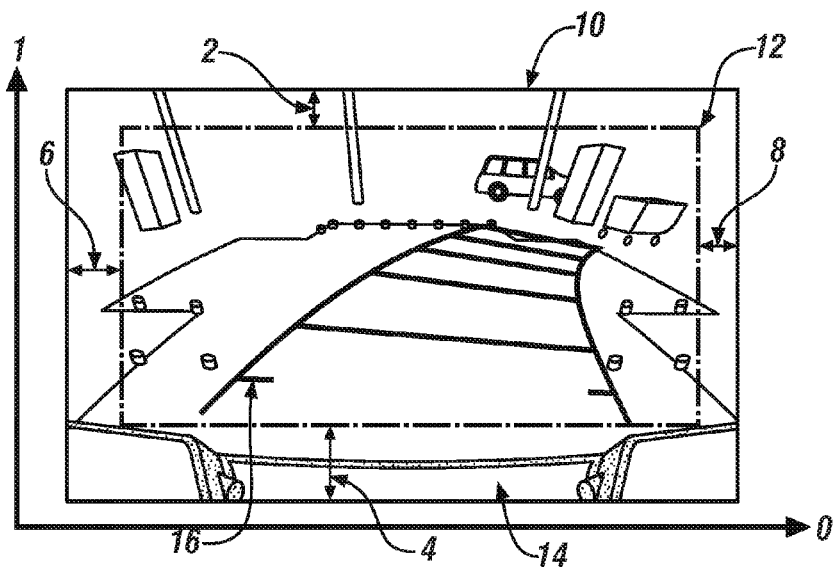
FIG. 2 illustrates an original image obtained from a vehicle rearward pinhole camera device and cropping parameters configured to exclude undesirable content from the original image, in accordance with the present disclosure.

FIG. 2 illustrates an original image 10 obtained from a vehicle rearward camera device and first, second, third and fourth cropping parameters 2, 4, 6, 8, respectively, configured to exclude undesirable content from the original image, in accordance with the present disclosure. In an exemplary embodiment, undesirable content from the original image includes a vehicle excessive bumper region 14. However, the undesirable content may include any content within the original image 10 that is not desired to be viewed. The original image 10 includes a rearward image having a point of view behind the vehicle obtained from the rearward camera device (e.g., rearward camera device 102 shown in FIG. 1) that includes a rearward wide FOV camera device. For instance, the rearward wide FOV camera device may be positioned proximate to a vehicle rearward license plate. The cropping parameters 2, 4, 6, 8 are configured to reduce at least one of a portion of the original image 10 along a first axis 0 and a portion of the original image 10 along a second axis 1. Each of the cropping parameters can be expressed in terms of a percentage of the portion of the original image that is being reduced. A graphic including a dynamic guideline overlay feature 16 is illustrated within an area defined by the cropping parameters 2, 4, 6, 8 and will be discussed with reference to FIG. 3. The first axis 0 corresponds to image width. Accordingly, the portion of the original image 10 along the first axis 0 is reduced utilizing the third and fourth cropping parameters 6, 8, respectively. The second axis 1 is orthogonal to the first axis and corresponds to image height. Accordingly, the portion of the original image 10 along the second axis 1 is reduced utilizing the second and third cropping parameters 2, 4, respectively. In an exemplary embodiment, the cropping parameters are predetermined based on dimensions and design of a selected vehicle at which the camera device is positioned upon. In another exemplary embodiment, the cropping parameters are user defined to encompass a desired area of interest within the original image and exclude undesirable content outside the desired area of interest.

Figure 3:
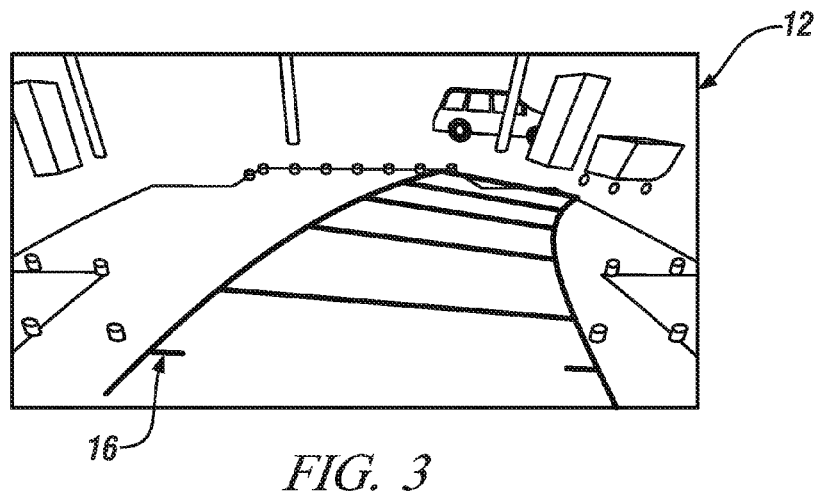
FIG. 3 illustrates a cropped image generated based on the cropping parameters illustrated in FIG. 2, in accordance with the present disclosure.

FIG. 3 illustrates a cropped image 12 generated based on the cropping parameters 2, 4, 6, 8 illustrated in FIG. 2, in accordance with the present disclosure. As illustrated in FIG. 3, the cropped image 12 corresponds to the area enclosed by the cropping parameters 2, 4, 6, 8 of FIG. 2, effectively excluding the undesirable content, e.g., bumper region 14, in the original image 10. It will be appreciated that the camera device contains intrinsic calibration information and extrinsic information inherent to the camera device, e.g., rearward camera device 102. The generation of the cropped image based on the cropping parameters requires the intrinsic calibration information to be adjusted so that a graphic, e.g., dynamic guideline overlay feature 16, can be accurately dynamically registered upon the cropped image 12 for eventual display upon a graphic projection display, e.g., the display monitor 152. The extrinsic calibration information for the camera device includes positional parameters and orientation parameters, and is not affected by the generation of the cropped image. Adjusting the intrinsic calibration information is based on a relationship to the cropping parameters 2, 4, 6, 8 and will be discussed in greater detail below. In an exemplary embodiment, the dynamically registered graphic including the dynamic guideline overlay feature 16 represents a desired path and positional information behind the vehicle. For instance, the dynamic guideline overlay feature 16 can represent the desired path to assist a driver in backing up a vehicle into a parking space and positional information of the vehicle in relation to the parking space. In one embodiment, the dynamic guideline overlay feature 16 is dynamically registered upon the cropped image 12 and displayed upon a graphic projection display for viewing by an operator of the vehicle when the user selects reverse operation of the vehicle. Other embodiments include dynamic guideline overlay features utilized for images obtained from a frontward camera device in front of the vehicle and/or images obtained from either side of the vehicle obtained from respective side view camera devices. It will be further appreciated that rearward, frontward and side view camera devices can be synthesized to obtained a top-down view image wherein the dynamic guideline feature can be dynamically registered upon such a top-down view.

Figure 4:
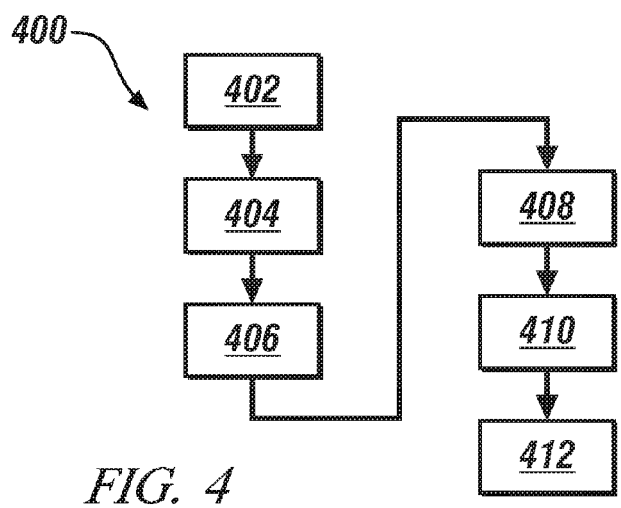
FIG. 4 illustrates an exemplary flowchart for dynamically registering a graphic upon a cropped image obtained from a camera device, in accordance with the present disclosure.

FIG. 4 illustrates an exemplary flowchart 400 for dynamically registering a graphic upon a cropped image obtained from a camera device, in accordance with the present disclosure. In the exemplary embodiment, the flowchart 400 dynamically registers the graphic including the dynamic guideline overlay feature 16 of the cropped image 12 illustrated in FIG. 3 unless otherwise stated. Table 1 is provided as a key to FIG. 4 wherein the numerically labeled blocks and the corresponding functions are set forth as follows.

TABLE 1

| BLOCK | BLOCK CONTENTS |
| --- | --- |
| 402 | Capture an original image obtained from the camera device |
| 404 | Monitor intrinsic calibration information for the camera device, extrinsic information for the camera device and vehicle information. |
| 406 | Generate the cropped image based on cropping parameters to exclude undesirable content from the original image. |
| 408 | Adjust the intrinsic calibration information based on a relationship to the cropping parameters. |
| 410 | Dynamically register the graphic upon the cropped image based on the adjusted intrinsic calibration information for the camera device, the monitored extrinsic information for the camera device and the monitored vehicle information. |
| 412 | Display the cropped image and the dynamically registered graphic upon the cropped image upon a graphic projection display. |

Figure 5:
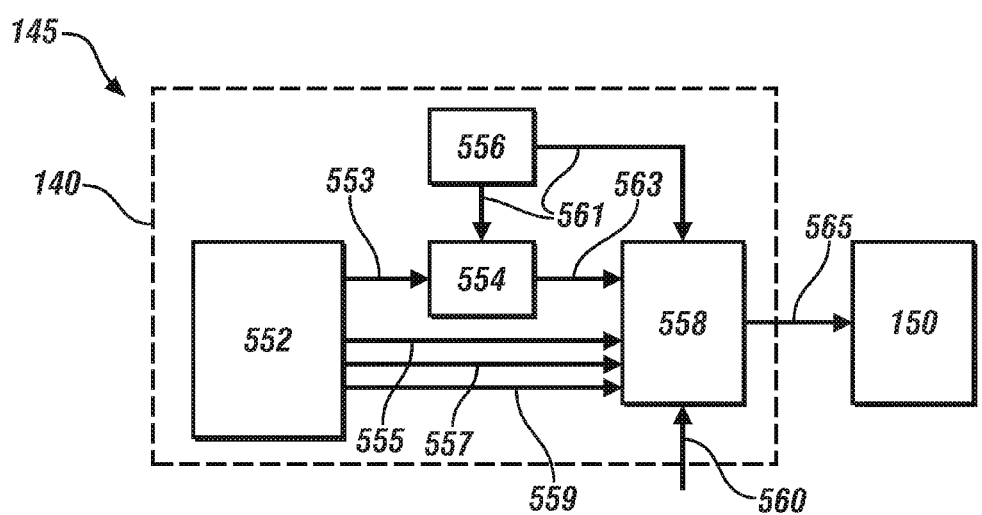
FIG. 5 illustrates an exemplary display system for displaying a dynamically registered graphic upon a cropped image upon a graphic projection display, in accordance with the present disclosure.

The flowchart 400 is integrated within the programmable processor of the aforementioned display system 145 of FIG. 1 and described in detail in FIG. 5. Accordingly, FIG. 5 will be referenced throughout the discussion of the numerically labeled blocks of the flowchart 400. The display system 145 illustrated in FIG. 5 includes the camera calibration module 140 and a graphic projection display module 150. The camera calibration module 140 includes an informational module 552, an adjustment module 554, a cropping parameters module 556, and a dynamic registration module 558.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation.

The flowchart 400 starts at block 402 wherein an original image obtained from the camera device is captured. In an exemplary embodiment, the original image includes the original image 10 of FIG. 2.

Referring to block 404, intrinsic calibration information 553 for the camera device, extrinsic information 555 for the camera device, radial distortion parameters 557 for the camera device and vehicle information 559 are monitored by the informational module 552. In an exemplary embodiment, the intrinsic calibration information 553 includes focal length parameters for the camera device and optical center parameters for the camera device. In an alternative embodiment, the intrinsic calibration information 553 includes a plurality of pixels associated with the original image. As aforementioned, the extrinsic information 555 can include positional parameters and orientation parameters for the camera device. The radial distortion parameters 557 include parameters applied to a captured image to correct features in the captured image that are straight but appear curved. Radial distortion is known in the art for wide FOV camera devices, and will not be discussed herein. Vehicle information 559 can include vehicle speed (e.g., obtained from the vehicle speed sensor 129 of FIG. 1), a frontward steering angle (e.g., obtained from the frontward steering angle sensor 130 of FIG. 1), a rearward steering angle (e.g., obtained from the rearward steering angle sensor 132 of FIG. 1) and a vehicle yaw rate (e.g., obtained from the yaw rate sensor 134 of FIG. 1). As illustrated in FIG. 5, only the monitored intrinsic calibration information 553 is input to the adjustment module 554. The extrinsic information 555, the radial distortion parameters 557 and the vehicle information 559 are all input to the dynamic registration module 558. The original image 560 (e.g., original image 10 of FIG. 2) is also input to the dynamic registration module 558.

Referring to block 406, the cropped image is generated based on cropping parameters to exclude undesirable content from the original image. In an exemplary embodiment, the cropping parameters module 556 inputs the cropping parameters 561 into the adjustment module 554 and the dynamic registration module 558. Accordingly, the cropped image is generated within the dynamic registration module 558 based on the cropping parameters 561 to exclude the undesirable content from the original image 560. As aforementioned, the cropping parameters 561 can be predetermined based on dimensions of a selected vehicle at which the camera device is positioned. Other embodiments may include the cropping parameters to be user defined to encompass a desired area of interest within the original image and exclude undesirable content outside the desired area of interest. When the cropping parameters are user defined, the cropping parameters can be dynamically updated in response to a user input adjusting the desired area of interest. When the cropping parameters are dynamically updated, the intrinsic calibration information is dynamically adjusted in response to the dynamically updated cropping parameters. Furthermore, the user input adjusting the desired area of interest can include adjusting a zoom range factor to one of increase and decrease the desired area of interest. As will become apparent, the adjusted dynamically adjusting cropping parameters can be associated with changing the zoom range factor of a captured image.

Referring to block 408, the intrinsic calibration information is adjusted based on a relationship to the cropping parameters. In an exemplary embodiment, the adjustment module 554 adjusts the monitored intrinsic calibration information 553 based on a relationship to the cropping parameters 561. Accordingly, adjusted intrinsic calibration information 563 is input the dynamic registration module 558.

Figure 6:
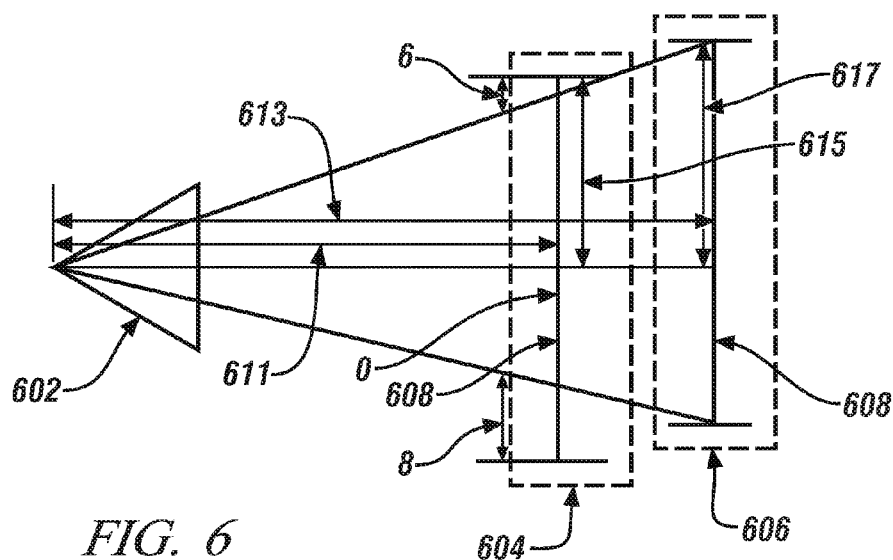
FIGS. 6 and 7 illustrate focal length parameters and optical center parameters for a camera device with respect to an original image and updated focal length parameters and updated optical center parameters for the camera device with respect to a cropped image, in accordance with the present disclosure.
Figure 7:
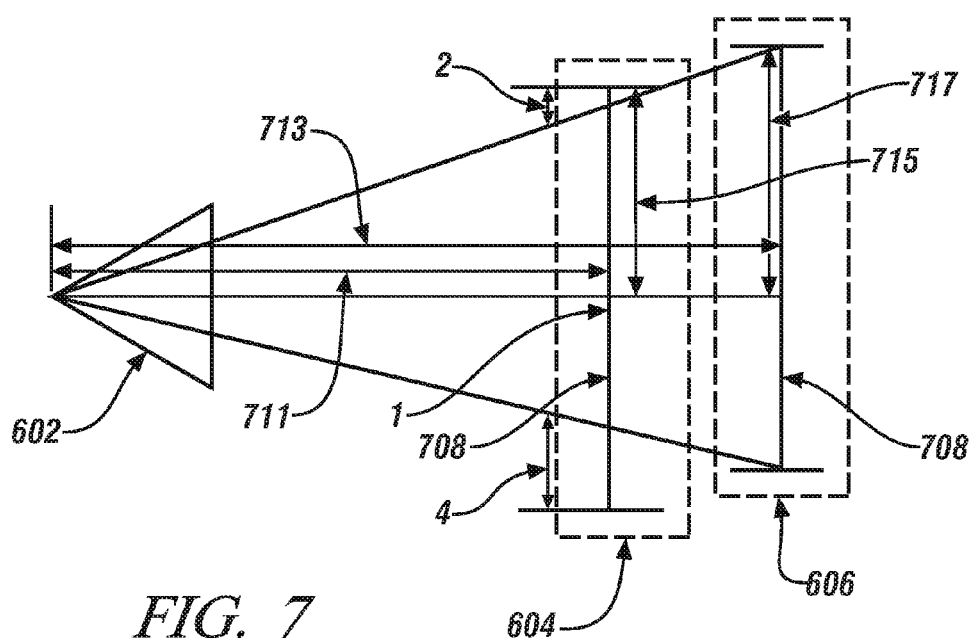

As aforementioned, and in an exemplary embodiment, the intrinsic calibration information 553 can include focal length parameters for the camera device and optical center parameters for the camera device. The focal length parameters can include a first focal length parameter in a first direction and a second focal length parameter in a second direction. The second direction is orthogonal to the first direction. The optical center parameters can include a first optical center parameter with respect to the first direction and a second optical center parameter with respect to the second direction. In an exemplary embodiment, FIGS. 6 and 7 illustrate focal length parameters 611 and 711 and optical center parameters 615 and 715 for a camera device 602 with respect to an original image 604 and updated focal length parameters 613 and 713 and updated optical center parameters 617 and 717 for the camera device 602 with respect to a cropped image 606. It will be appreciated that image width 608 remains the same for both the original image 604 and the cropped image 606 because resolution and display size of the graphic projection display does not change. Likewise, image height 708 remains the same for both the original image 604 and the cropped image 606 because resolution and display size of the graphic projection display does not change. In the exemplary embodiment, the camera device 602 corresponds to the rearward camera device 102 of FIG. 1, the original image 604 corresponds to the original image 10 of FIG. 1 and the cropped image 606 corresponds the cropped image 12 of FIG. 1.

Referring to FIGS. 5 and 6, the first focal length parameter 611 included within the intrinsic calibration information 553 is input to the adjustment module 554. The first focal length parameter 611 perpendicular to the first axis 0 is updated based on a mathematical relationship between the first focal length parameter 611 and the third and fourth cropping parameters 6, 8, respectively configured to reduce the portion of the original image 604 along the first axis corresponding to image width. The updated first focal length parameter 613 is calculated as follows:

$$fu_{updated} = \frac{fu}{1 - c\% - d\%} \quad [1]$$

wherein
$fu_{updated}$ is the updated first focal length parameter 613,
fu is the monitored first focal length parameter 611,
c is the third cropping parameter 6, and
d is the fourth cropping parameter 8.

Still referring to FIGS. 5 and 6, the first optical center parameter 615 included within the intrinsic calibration information 553 is input to the adjustment module 554. The first optical center parameter 615 with respect to the first axis 0 is updated based on a mathematical relationship between the first optical center parameter 615, the third and fourth cropping parameters 6, 8, respectively, and the image width 608. The updated first optical center parameter 617 is calculated as follows:

$$u0_{updated} = \left( \frac{\frac{u0}{imgW} - c\%}{1 - c\% - d\%} \right) \times imgW \quad [2]$$

wherein
$u0_{updated}$ is the updated first optical center parameter 617,
u0 is the monitored first optical center parameter 615, and
imgW is the image width 608.

Referring to FIGS. 5 and 7, the second focal length parameter 711 included within the intrinsic calibration information 553 is input to the adjustment module 554. The second focal length parameter 711 perpendicular to the second axis 1 is updated based on a mathematical relationship between the second focal length parameter 711 and the first and second cropping parameters 2, 4, respectively, configured to reduce the portion of the original image 604 along the second axis corresponding to image height 708. The updated second focal length parameter 713 is calculated as follows:

$$fv_{updated} = \frac{fv}{1 - a\% - b\%} \quad [3]$$

wherein
$fv_{updated}$ is the updated second focal length parameter 713,
fv is the monitored second focal length parameter 711,
a is the first cropping parameter 2, and
b is the second cropping parameter 4.

Still referring to FIGS. 5 and 7, the second optical center parameter 715 included within the intrinsic calibration information 553 is input to the adjustment module 554. The second optical center parameter 715 with respect to the second axis 1 is updated based on a mathematical relationship between the second optical center parameter 715, the first and second cropping parameters 2, 4, respectively, and the image height 708. The updated second optical center parameter 717 is calculated as follows:

$$v0_{updated} = \left( \frac{\frac{v0}{imgH} - a\%}{1 - a\% - b\%} \right) \times imgH \quad [4]$$

wherein $v0_{updated}$ is the updated second optical center parameter 717,
v0 is the monitored second optical center parameter 715, and
imgH is the image height 708.

Figure 11:
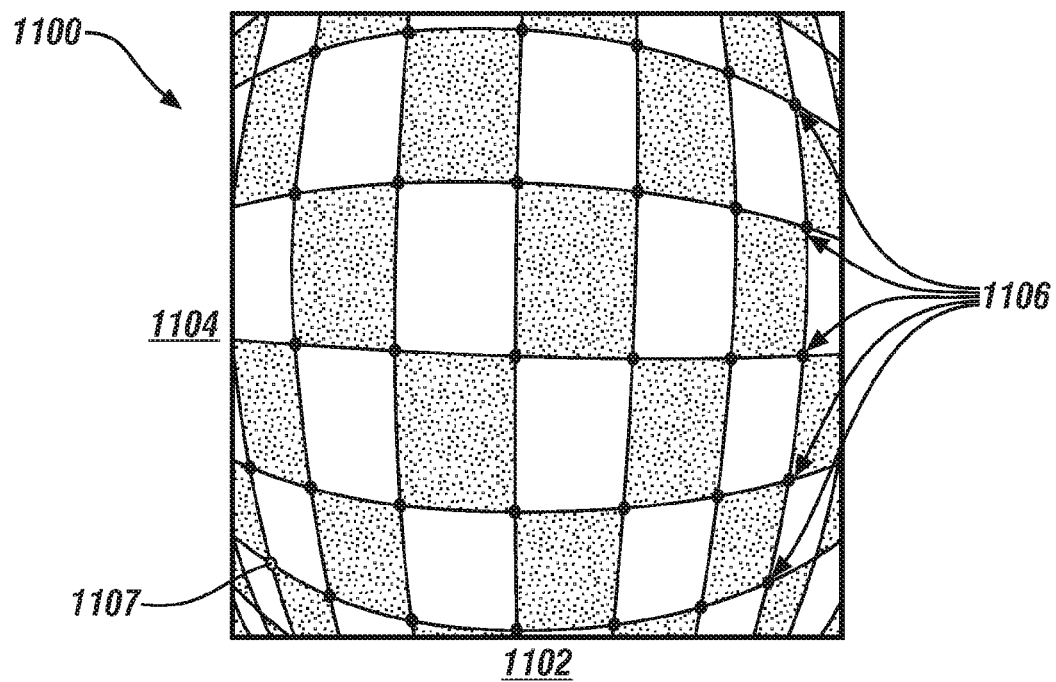
FIG. 11 illustrates a plurality of pixels manually labeled with respect to a two-dimensional grid applied over an original image, in accordance with the present disclosure.

As aforementioned, and in an alternative embodiment, the intrinsic calibration information 553 can include a plurality of pixels associated with the original image. Referring to FIG. 11, a two-dimensional grid having a third axis 1102 and a fourth axis 1104 in world coordinates is applied over an original image 1100. The two-dimensional grid visually appears as a checkerboard pattern in FIG. 11 wherein respective sub-grids correspond to respective ones of the shaded and white portions of the two-dimensional grid. It will be appreciated that each sub-grid includes equal dimensions in each of the horizontal and vertical directions, i.e., third and fourth axis 1102, 1104, respectively. A plurality of pixels 1106 are manually labeled with respect to the two-dimensional grid applied over the original image. Each pixel having a respective coordinate with respect to the third axis 1102 and the fourth axis 1104, the fourth axis 1104 is orthogonal to the third axis 1102. Thus, each pixel is a corner pixel manually labeled in the corners of each sub-grid. The respective coordinate is also respective to the first axis associated with image width and the second axis associated with image height, and thus contains image coordinates associated with the first and second axis. The third axis may include a world coordinate horizontal axis and the fourth axis may include a world coordinate vertical axis. Pixel 1107 corresponds to an origin pixel with respect to the two-dimensional grid.

Table 2 illustrates a sample of the manually labeled plurality of pixels with respect to the two-dimensional grid applied over the original image of FIG. 11, each pixel having a respective coordinate with respect to the third axis and the fourth axis. The respective coordinate is also respective to the first axis associated with image width and the second axis associated with image height.

TABLE 2

| $1^{st}$ axis | $2^{nd}$ axis | $3^{rd}$ axis | $4^{th}$ axis |
|---|---|---|---|
| 152.05 | 410.26 | 6.000 | 0 |
| 202.75 | 416.51 | 6.000 | 1.000 |
| 259.66 | 418.04 | 6.000 | 2.000 |
| 318.13 | 417.62 | 6.000 | 3.000 |
| 377.62 | 415.48 | 6.000 | 4.000 |
| 435.30 | 412.10 | 6.000 | 5.000 |
| 490.68 | 406.71 | 6.000 | 6.000 |

Subsequent to the manual labeling shown above in Table 2, the plurality of pixels associated with the original image is transferred to the cropped image.

Referring to FIGS. 5, 6, 7 and 11, the plurality of pixels associated with the original image are included within the intrinsic calibration information 553 and input to the adjustment module 554. The adjustment module 554 applies a mathematical relationship of pixel translation to transfer the plurality of pixels associated with the original image to the cropped image. Accordingly, a location of each of the pixels 1106 in the cropped image with respect to the first axis are re-calibrated based on a mathematical relationship between the plurality of pixels with respect to the first axis, the third and fourth cropping parameters 6, 8, respectively, configured to reduce the portion of the original image along the first axis and image width as follows:

$$x_{updated} = \left( \frac{x}{ImgW - c\ \%} \right) \times imgW \quad [5]$$

wherein $x_{updated}$ is the re-calibrated pixel location in the cropped image with respect to the first axis, and x is the pixel location associated with the original image with respect to the first axis.

Therefore, each re-calibrated pixel location in the cropped with respect to the first axis, $x_{updated}$, corresponds to a pixel location with respect to the first axis now associated with the cropped image. Similarly, a location each of the pixels 1106 in the cropped image with respect to the second axis are re-calibrated based on a mathematical relationship between the plurality of pixels with respect to the second axis, the first and second cropping parameters 2, 4, respectively, configured to reduce the portion of the original image along the second axis and image height as follows:

$$y_{updated} = \left( \frac{y}{ImgH - a\ \%} \right) \times imgH \quad [6]$$

wherein $y_{updated}$ is the re-calibrated pixel location in the cropped image with respect to the second axis, and y is the pixel location associated with the original image with respect to the second axis.

Therefore, each re-calibrated pixel location in the cropped image respective of the second axis, $y_{updated}$, corresponds to a pixel location with respect to the second axis now associated with the cropped image.

Figure 12:
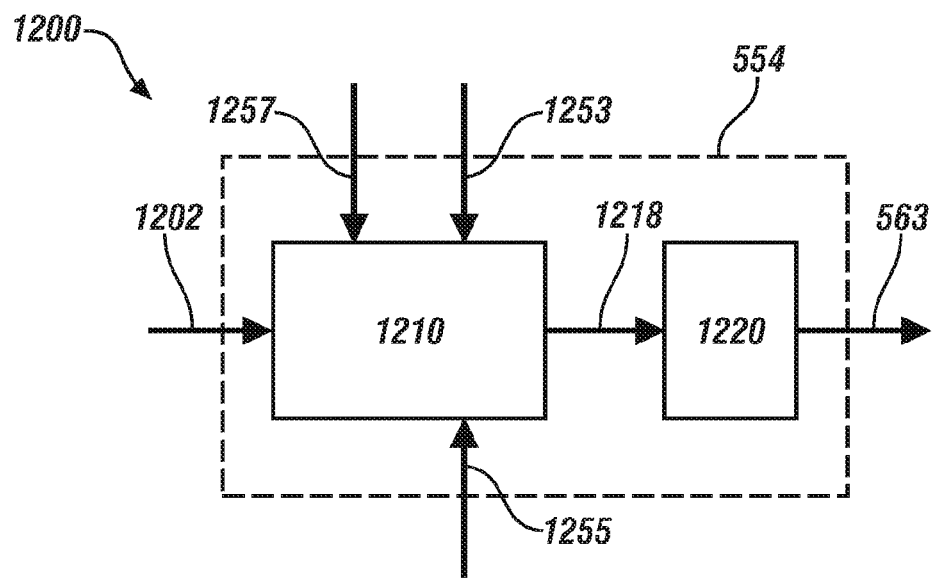
FIG. 12 illustrates an expected error for determining expected pixel errors with respect to a first and a second axis in a cropped image, in accordance with the present disclosure.

In the alternative embodiment for adjusting intrinsic calibration information utilizing pixel translation described above in FIG. 11, FIG. 12 illustrates an expected error module 1210 integrated within the adjustment module 554 for determining expected pixel errors in the cropped image with respect to the first and second axis. Input 1202 represents $x_{updated}$ and $y_{updated}$ calculated in Equations [5] and [6], respectively, for each of the pixels 1106 labeled on the two-dimensional grid. Input 1253 represents focal length parameters and optical center parameters for the camera device (e.g., shown in FIGS. 6 and 7). Input 1257 represents radial distortion parameters. Input 1255 represents extrinsic parameters for each captured image 1100 having the two-dimensional grid applied thereover. Accordingly, the expected error module 1210 determines expected pixel errors 1218 in the cropped image with respect to the first and second axis. In other words, the expected error module 1218 monitors $x_{updated}$ and $y_{updated}$, the focal length parameters and the optical center parameters for the camera device, the radial distortion parameters for the camera device and the extrinsic parameters for the camera device and determines the expected pixel errors 1218 in the cropped image with respect to the first and second axis. The expected pixel errors 1218 are input to the threshold module 1220. If the expected pixel errors with respect to the first axis are greater than a horizontal threshold, a calibration failure is determined and calibration must be redone. If the expected pixel errors with respect to the second axis are greater than a vertical threshold, a calibration failure is determined and calibration must be redone. If the expected pixel errors with respect to the first axis are not greater than the horizontal threshold and the expected pixel errors with respect to the second axis are not greater than the vertical threshold, the adjusted intrinsic calibration information 563 is input to the dynamic registration module 558 of FIG. 5 because the expected pixel errors 1218 are deemed acceptable. It will be appreciated that only pixels that remain visible subsequent to image cropping will be evaluated within the expected error module 1210.

Referring to block 410 of the flowchart 400, a graphic is dynamically registered upon a cropped image based on the adjusted intrinsic calibration information for the camera device, the monitored extrinsic information for the camera device and the monitored vehicle information. In an exemplary embodiment, the cropping parameters 561, the adjusted intrinsic calibration information 563, the extrinsic calibration information 555, the radial distortion parameters 557 for the camera device, the vehicle information 559 and the original image 560 are all input to the dynamic registration module 558. As aforementioned, the cropped image is generated within the dynamic registration module 558 based on the cropping parameters 561 to exclude the undesirable content from the original image 560. The dynamic registration module 558 further dynamically registers a graphic upon the cropped image based on the adjusted intrinsic calibration information 563, the extrinsic calibration information 555, the radial distortion parameters 557 and the vehicle information 559. The dynamic registration module 558 outputs a dynamic registration signal 565 representing the dynamically registered graphic upon the cropped image to the graphic projection display module 150. In a non-limiting example, the dynamically registered graphic includes the dynamic guideline overlay feature 16 dynamically registered over the cropped image 12 illustrated in FIG. 3. This disclosure is not limited to the content of the graphic, and can include any feature, shape, symbol, text, or color for dynamic registration upon a cropped image.

Referring to block 412, the cropped image and the dynamically registered graphic upon the cropped image is displayed upon a graphic projection display. In an exemplary embodiment, the graphic projection display module 150 displays the cropped image and the dynamically registered graphic upon the cropped image upon the graphic projection display. In one example, the graphic projection display includes a touch screen display. In another example, the graphic projection display includes a human machine interface display. In yet another example, the graphic projection display includes one of a rear-view mirror display and a side-view mirror display. In yet another example, the graphic projection display can include a display monitor.

Figure 8:
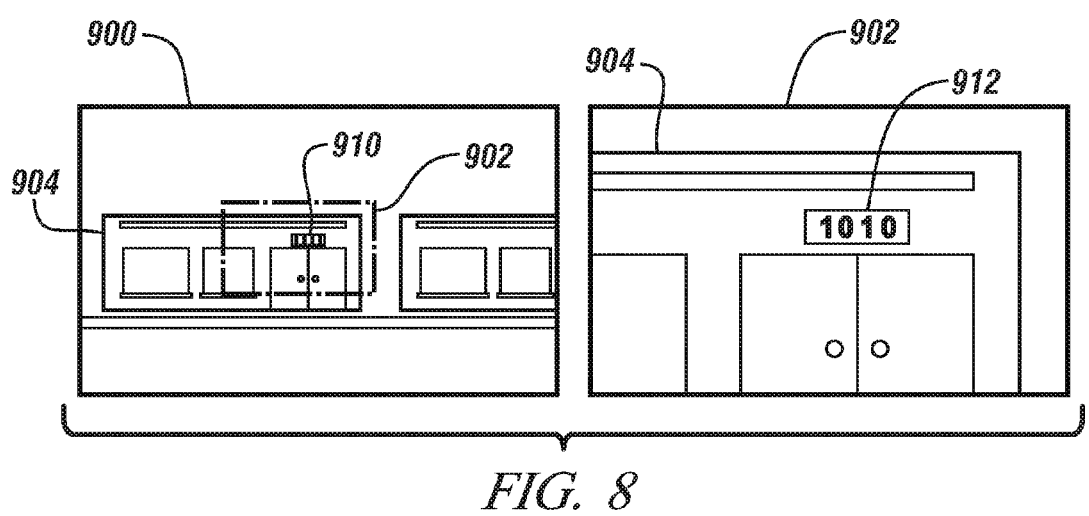
FIG. 8 illustrates an original image, a generated cropped image based on cropping parameters that are user defined to encompass a desired area of interest within the original image, and an overlay graphic representing content of a display sign when the desired area of interest encompasses the display sign.

As aforementioned, the cropping parameters 561 can be user defined to encompass a desired area of interest within the original image and exclude undesirable content outside the desired area of interest. For instance, an operator of the vehicle can directly input the cropping parameters to encompass a desired area of interest via an input device. The user input device can include, but is not limited to, a joystick, a touch screen interface, a gesturing device, a keyboard or a mouse. FIG. 8 illustrates an example of an original image 900, a generated cropped image 902 based on cropping parameters that are user defined to encompass a desired area of interest within the original image and an overlay graphic 912 representing content of a display sign 910 when the desired area of interest encompasses the display sign. In the example illustrated in FIG. 8, a frontward camera device, e.g., frontward camera device 104 of FIG. 1, may capture an original image 900 including a storefront 904 with the display sign 910 upon the store front. An operator or user may desire to read the content of the display sign 910. The operator or user may define a desired area of interest within the original image to get a closer view of the display sign 910 based on a user input. In one example, the desired area of interest corresponds to the cropped image 902 and encompasses the display sign 910. The graphic including the overlay graphic 912 represents textual content on the display sign 910. The overlay graphic can be accessed from a database using image-recognition software utilizing camera location and viewpoints as additional inputs to decipher the content of the display sign 910 and thereby dynamically register the overlay graphic 912 over the display sign 910. Further embodiments envisioned include the overlay graphic representing the shape of the display sign and/or symbols on the display sign including logos.

Figure 9:
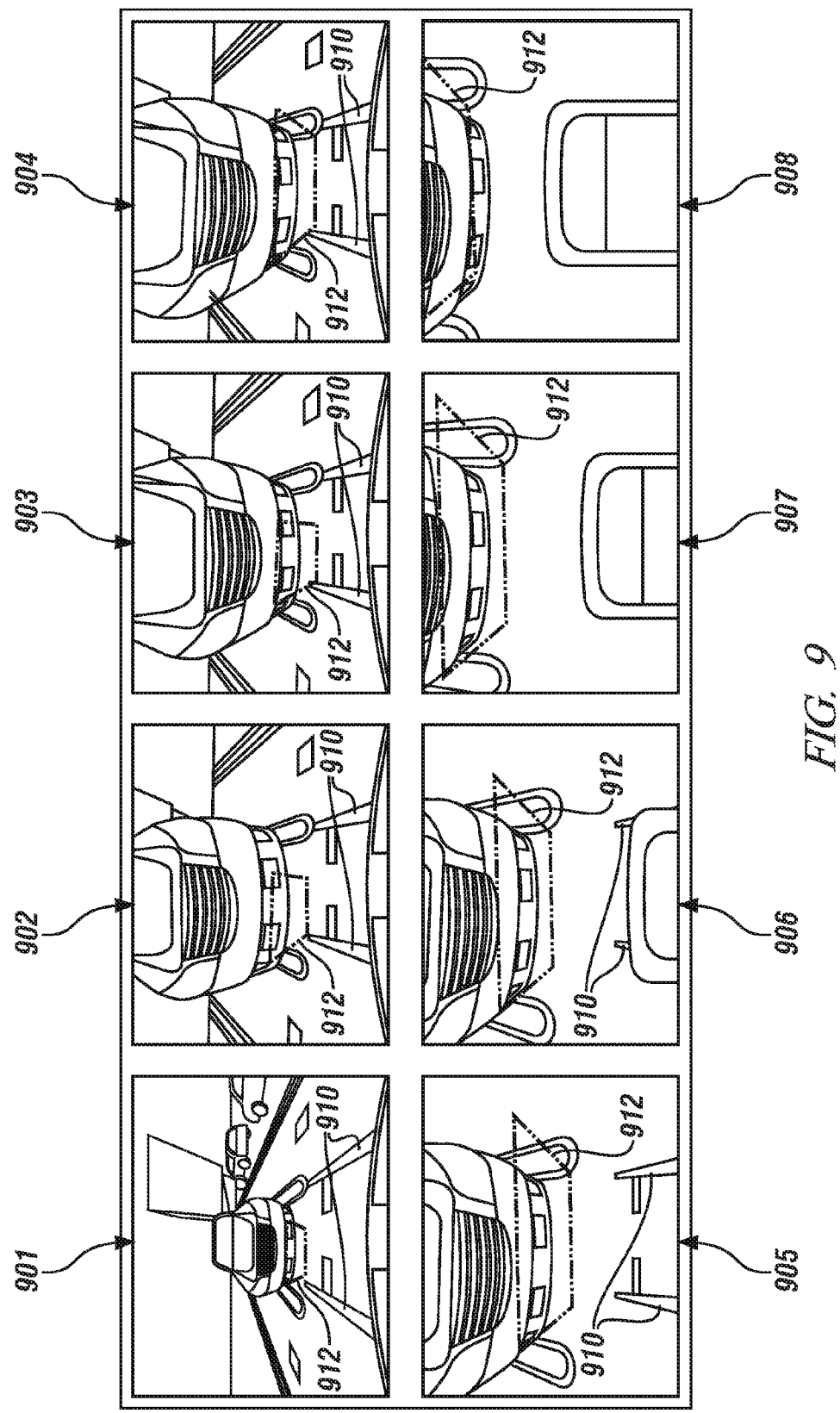
FIG. 9 illustrates rearward images obtained from a rearward camera device having a changing point of view, each of the rearward images associated with a respective point of view and respective cropping parameters, in accordance with the present disclosure.

FIG. 9 is an example of rearward images obtained from a rearward wide FOV camera device having a changing point of view, i.e., a focused region of interest (ROI). Each of the rearward images associated with a respective ROI and respective cropping parameters. Each of images 901-908 have been cropped according to dynamically updated cropping parameters to exclude undesirable content from an original image captured by the rearward wide FOV camera device. The rearward wide FOV camera device is adjustable so that the ROI of the camera can synthesize the changing ROIs in each of the images to simulate a virtual camera that moves. Accordingly, each of images 901-908 correspond to a respective virtual viewpoint of the rearward camera device. For instance, the rearward wide FOV camera device presumes a flat plane assumption, wherein a pitch-down angle in each of images 901-908 changes. In one example, the pitch-down angle of the captured image 901 is 30° whereas the pitch-down angle of the captured image 908 is 90° corresponding to a bird's eye view of the parking space. As illustrated in FIG. 9, the images contain a first graphic 910 including a dynamic guideline overlay feature that is dynamically registered based on a relationship to the respective cropping parameters in respective ones of the images 901-906. The first graphic 910 including the dynamic guideline overlay feature represents a desired path to assist a vehicle backing up and avoiding a collision with a target vehicle behind the vehicle. A second graphic 912 includes an object overlay feature that is dynamically registered based on a relationship to the respective cropping parameters in respective ones of the images 901-908. The second graphic 912 including the object overlay feature represents the position of a target vehicle in relation to the vehicle. As illustrated, the second graphic 912 including the object overlay increases in size as the distance between the vehicle backing up and the target vehicle decreases.

Figure 10:
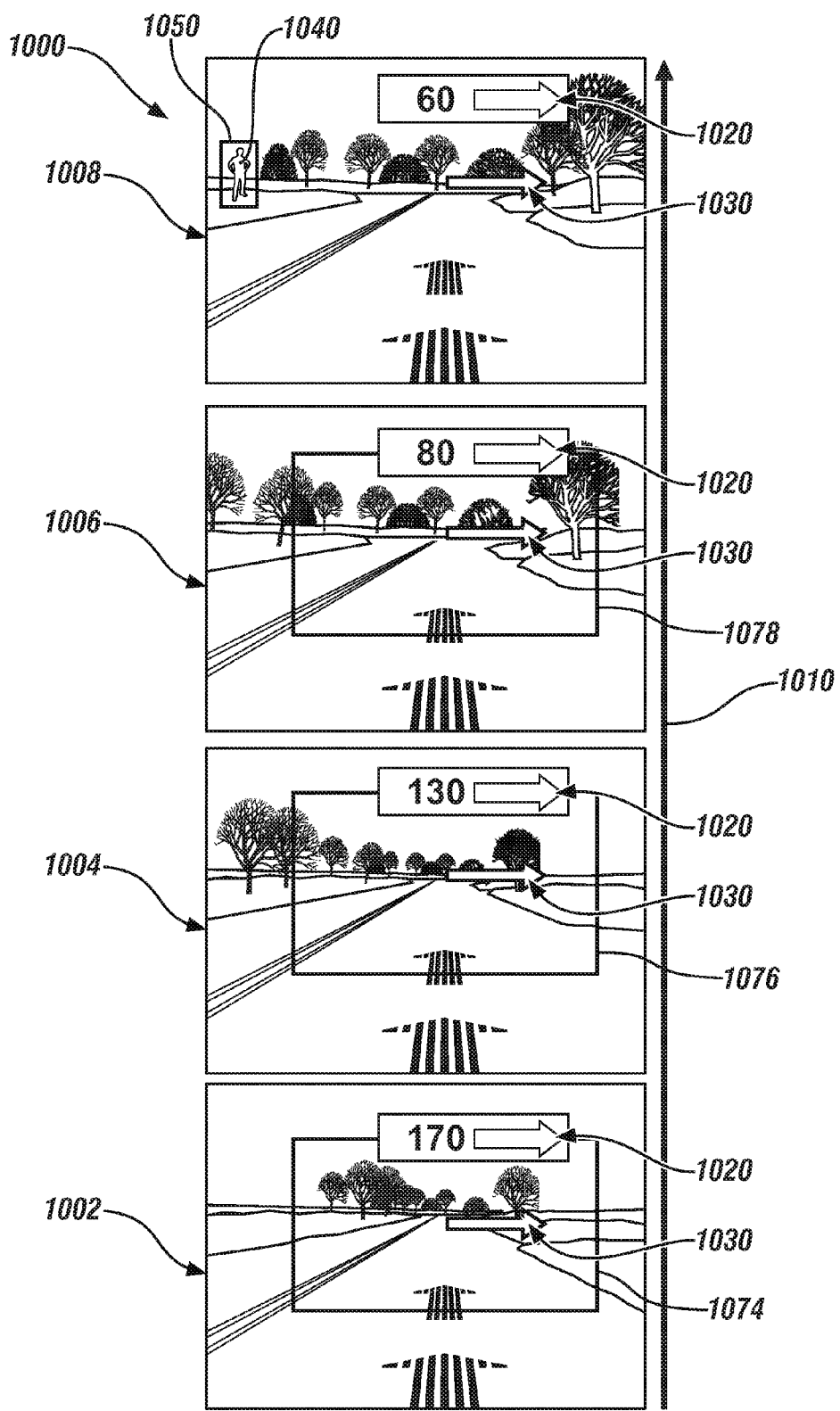
FIG. 10 illustrates frontward images obtained from a frontward camera device depicting a driving scene in front of the vehicle, in accordance with the present disclosure.

FIG. 10 is an example of frontward images obtained from a frontward camera device depicting a driving scene in front of a vehicle. In the example, the cropping parameters are dynamically updated between each of the images 1002, 1004, 1006 and 1008 in response to a user input adjusting the desired area of interest. For instance, the desired area of interest can include an upcoming section of roadway. Accordingly, the intrinsic calibration information is dynamically adjusted in response to the dynamically updated cropping parameters. In one embodiment, the user input adjusting the desired area of interest can include adjusting a zoom range factor to one of increase and decrease the desired area of interest. For instance, the zoom factor range for each of the images increases in the direction of arrow 1010 from each of the images 1002, 1004, 1006 and 1008. Referring to image 1002, adjusting the zoom range factor decreases the desired area of interest 1074, wherein image 1004 corresponds to the desired area of interest 1074 of image 1002. Referring to image 1004, adjusting the zoom range factor decreases the desired area of interest 1076, wherein image 1006 corresponds to the desired area of interest 1076 of image 1004. Referring to image 1006, adjusting the zoom range factor decreases the desired area of interest 1078, wherein image 1008 corresponds to the desired area of interest 1078 of image 1006.

The example illustrated in FIG. 10 can further include monitoring informational inputs related to the desired area of interest. For instance, first, second and third detection device modules 160, 161, 170, respectively, can monitor informational inputs relating to the upcoming section of roadway. The informational inputs can be analyzed to determine a feature of interest. In the example, the feature of interest can include an upcoming maneuver point 1030, and at least one of the first, second and third detection device modules 160, 161, 170, respectively, can be utilized to determine a time or distance to the upcoming maneuver point 1030, e.g., a right hand turn. Subsequently, a graphic can be determined for dynamic registration upon the cropped image based upon the feature of interest. For instance, the graphic can include a navigation status graphic 1020 representing the point of interest including the upcoming maneuver point 1030. The navigation status graphic 1020 illustrated in FIG. 10 includes an arrow pointing to the right indicating the right hand turn at the upcoming maneuver point. The navigation status graphic 1020 further includes a distance to the upcoming maneuver point. In one example, the distance to the upcoming maneuver point takes into account the updated cropping parameters, e.g., increased zoom factor, to simulate how the maneuver is viewed from closer distances. Maneuver points are not limited to distances and turns and can include speed maneuvers, stopping maneuvers and any maneuver related to vehicle navigation.

In another exemplary embodiment, the analyzed informational inputs can detect a feature of interest including, for example, a pedestrian, lane markings, and a vehicle. The graphic for dynamic registration upon the cropped image based upon the feature of interest and include a highlight graphic representing the feature of interest. In the example illustrated in FIG. 10, the feature of interest includes a detected pedestrian 1040 shown in image 1008. It will be appreciated that the detected pedestrian 1040 only becomes visible in image 1008 due to the increased zoom factor associated therewith. A graphic 1050 is dynamically registered upon the cropped image 1008 based upon the detected pedestrian 1040. The graphic 1050 is a highlight graphic outlining the location of the detected pedestrian.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for dynamically registering a graphic upon a rectangularly cropped image obtained from a camera device, comprising:
   capturing an original image obtained from the camera device;
   outputting the original image obtained from the camera device to a camera calibration module;
   monitoring intrinsic calibration information for the camera device including focal length parameters for the camera device, extrinsic information for the camera device, radial distortion parameters for the camera device, and vehicle information;
   monitoring a set of cropping parameters capable of being dynamically updated, wherein the cropping parameters are configured to reduce at least one of a portion of the original image along a first axis corresponding to an image width and a portion of the original image along a second axis orthogonal to the first axis and corresponding to an image height;
   generating the rectangularly cropped image within a dynamic registration module of the camera calibration module, the rectangularly cropped image based on the monitored cropping parameters to exclude undesirable content from the original image, such that the cropped image corresponds to the area of the original image bound within the monitored rectangular cropping parameters;
   adjusting the intrinsic calibration information within an adjustment module of the camera calibration module, wherein adjusting the intrinsic calibration information is based on a mathematical relationship to the cropping parameters, in response to the monitored cropping parameters being dynamically updated, such that the graphic can be accurately dynamically registered upon the rectangularly cropped image, said adjusting the intrinsic calibration information comprising:
   updating a first focal length parameter perpendicular to the first axis based on a mathematical relationship between the first focal length parameter and the cropping parameters configured to reduce the portion of the original image along the first axis corresponding to the image width, wherein the first focal length parameter is updated in accordance with the following relationship:

$$fu_{updated} = \frac{fu}{1 - c\% - d\%}$$

wherein $fu_{updated}$ is the updated first focal length parameter,
      fu is the first focal length parameter, and
      c and d are cropping parameters corresponding to image width;
   updating a second focal length parameter perpendicular to the second axis based on a mathematical relationship between the second focal length parameter and the cropping parameters configured to reduce the portion of the original image along the second axis corresponding to the image height;
   dynamically registering the graphic upon the rectangularly cropped image within the dynamic registration module, the dynamic registering based on the adjusted intrinsic calibration information for the camera device including the updated first focal length parameter and the updated second focal length parameter, the monitored extrinsic information for the camera device, the monitored radial distortion parameters for the camera device and the monitored vehicle information; and
   displaying the rectangularly cropped image and the dynamically registered graphic upon the cropped image upon a graphic projection display.

2. The method of claim 1 wherein the camera device comprises at least one of a rearward camera device, a frontward camera device, and a side view camera device.

3. The method of claim 2 wherein the dynamically registered graphic comprises a dynamic guideline overlay feature representing a desired path and positional information behind the vehicle.

4. The method of claim 1 wherein the cropping parameters are predetermined based on dimensions and design of a vehicle upon which the camera device is positioned.

5. The method of claim 1 wherein the cropping parameters include a user defined area of interest within the original image and exclude a user defined area outside the area of interest.

6. The method of claim 1 wherein the intrinsic calibration information for the camera device further comprises optical center parameters, and wherein adjusting the intrinsic calibration information based on the relationship to the cropping parameters further comprises:

updating a first optical center parameter with respect to the first axis based on a mathematical relationship between the first optical center parameter, said cropping parameters configured to reduce the portion of the original image along the first axis; and updating a second optical center parameter with respect to the second axis based on a mathematical relationship between the second optical center parameter, said cropping parameters configured to reduce the portion of the original image along the second axis.

7. The method of claim 1 wherein the intrinsic calibration information for the camera device comprises a plurality of pixels associated with the original image, and wherein adjusting the intrinsic calibration information based on the relationship to the cropping parameters comprises:

applying a two-dimensional grid having a third axis and a fourth axis over the original image, the fourth axis orthogonal to the third axis;

manually labeling the plurality of pixels with respect to the two-dimensional grid applied over the original image, each pixel having a respective coordinate with respect to the third and fourth axes; and transferring the plurality of pixels associated with the original image to the cropped image, comprising re-calibrating a location of each of the plurality of pixels in the cropped image with respect to the first axis based on a mathematical relationship between the plurality of pixels with respect to the first axis, said cropping parameters configured to reduce the portion of the original image along the first axis, and re-calibrating a location of each of the plurality of pixels in the cropped image with respect to the second axis based on a mathematical relationship between the plurality of pixels with respect to the second axis, said cropping parameters configured to reduce the portion of the original image along the second axis.

8. The method of claim 7 wherein the third axis corresponds to a world coordinate horizontal axis and the fourth axis corresponds to a world coordinate vertical axis.

9. The method of claim 7 wherein the intrinsic calibration information further comprises focal length parameters and optical center parameters, said method further comprising:

monitoring radial distortion parameters for the camera device;

monitoring the re-calibrated plurality of pixels with respect to the third axis and the re-calibrated plurality of pixels with respect to the fourth axis;

determining expected pixel errors in the cropped image with respect to the first and second axes based on the monitored focal length parameters, the optical center parameters, the radial distortion parameters, the extrinsic information, each re-calibrated pixel location in the cropped image with respect to the first axis and eachre-calibrated pixel location in the cropped image with respect to the second axis;

comparing the expected pixel errors with respect to the first axis to a first threshold;

comparing the expected pixel errors with respect to the second axis to a second threshold; and determining a calibration failure if one of the expected pixel errors with respect to the first axis is greater than the first threshold and the expected pixel errors with respect to the second axis is greater than the second threshold.

10. The method of claim 5 further comprising:
dynamically updating the cropping parameters in response to a user input adjusting the area of interest; and dynamically adjusting the intrinsic calibration information in response to the dynamically updated cropping parameters.

11. The method of claim 10 wherein the user input adjusting the area of interest comprises the user input adjusting a zoom range factor to one of increase and decrease the desired area of interest.

12. The method of claim 5 wherein the graphic comprises an overlay graphic representing at least one of text, symbols and shape of a display sign when the desired area of interest encompasses the display sign, said overlay graphic being dynamically registered over the display sign.

13. The method of claim 5 further comprising:
monitoring informational inputs related to the area of interest;

analyzing the informational inputs to detect a feature of interest; and determining the graphic for dynamic registration upon the cropped image based upon the feature of interest.

14. The method of claim 13 wherein the feature of interest comprises an upcoming maneuver point and the graphic comprises a navigation status graphic representing the upcoming maneuver point.

15. The method of claim 13 wherein:
the feature of interest comprises at least one of a pedestrian, a lane marking, and a vehicle; and the graphic comprises a highlight graphic representing the feature of interest.

16. The method of claim 1 further comprising:
displaying the cropped image and the dynamically registered graphic upon the cropped image upon a graphic projection display, said graphic projection display comprising one of a touch screen display, a human machine interface display, a rear-view mirror display, a side-view mirror display and a display monitor.

17. Method for registering a graphic upon a rectangularly cropped image obtained from a camera device, comprising:

capturing an original rearward image having a point of view behind a vehicle obtained from a rearward wide field of view camera device positioned proximate to a rearward end of the vehicle;

outputting the original rearward image obtained from the camera device to a camera calibration module;

monitoring intrinsic calibration information for the camera device comprising focal length parameters for the camera device and optimal center parameters for the camera device;

monitoring radial distortion parameters for the camera device;

monitoring extrinsic information for the camera device comprising positional parameters and orientation parameters;

monitoring vehicle information comprising vehicle speed, orientation and steering angle parameters;

monitoring a set of predetermined cropping parameters capable of being dynamically updated, wherein the cropping parameters are configured to reduce at least one of a portion of the original image along a first axis corresponding to an image width and a portion of the original image along a second axis orthogonal to the first axis and corresponding to an image height;

generating the rectangularly cropped image within a dynamic registration module of the camera calibration module, the rectangularly cropped image based on the monitored set of predetermined cropping parameters to exclude undesirable content from the original image, the monitored predetermined cropping parameters configured to reduce a portion of the original rearward image, such that the cropped image corresponds to the area of the original image bound within the monitored rectangular cropping parameters;

updating the intrinsic calibration information within an adjustment module of the camera calibration module, wherein updating the intrinsic calibration information is based on a mathematical relationship to the monitored predetermined cropping parameters, such that the graphic can be dynamically registered upon the rectangularly cropped image based on accurately calibrated intrinsic calibration information including focal length parameters, comprising updating a first focal length parameter to the first axis based on a mathematical relationship between the first focal length parameter and said monitored predetermined cropping parameters configured to reduce the portion of the original image along the first axis corresponding to the image width, and updating a second focal length parameter perpendicular to the second axis based on a mathematical relationship between the second focal length parameter and said monitored predetermined cropping parameters configured to reduce the portion of the original image along the second axis corresponding to the image height, updating a first optical center parameter along the first axis based on a mathematical relationship between the first optical center parameter and said monitored predetermined cropping parameters configured to reduce the portion of the original image along the first axis corresponding to the image width, wherein the first optical center parameter is updated in accordance with the following relationship:

$$u0_{updated} = \left(\frac{\frac{u0}{imgW - c\%}}{1 - c\% - d\%}\right) \times imgW$$

wherein $u0_{updated}$ is the updated first optical center parameter,
u0 is the first optical center parameter, and
imgW is the image width, and updating a second optical center parameter along the second axis based on a mathematical relationship between the second optical center parameter and said monitored predetermined cropping parameters configured to reduce the portion of the original image along the second axis corresponding to the image height;

dynamically registering the graphic upon the rectangularly cropped image within the dynamic registration module, the dynamic registering based on the adjusted intrinsic calibration information for the camera device, the monitored radial distortion parameters for the camera device, the monitored extrinsic information for the camera device and the monitored vehicle information; and displaying the rectangularly cropped image and the dynamically registered graphic upon the cropped image upon a graphic projection display, said graphic projection display comprising one of a touch screen display, a human machine interface display, a rear-view mirror display, a side-view mirror display and a display monitor.

18. The method of claim 1 wherein the second focal length parameter is updated in accordance with the following relationship:

$$fv_{updated} = \frac{fv}{1 - a\% - b\%}$$

wherein $fv_{updated}$ is the updated second focal length parameter,
fv is the second focal length parameter, and
a and b are cropping parameters corresponding to image height.

19. The method of claim 17 wherein the second optical center parameter is updated in accordance with the following relationship:

$$v0_{updated} = \left(\frac{\frac{v0}{imgH - a\%}}{1 - a\% - b\%}\right) \times imgH$$

wherein $V0_{updated}$ is the second first optical center parameter,
V0 is the second optical center parameter, and
imgH is the image height.

20. Method for registering a graphic upon a rectangularly cropped image obtained from a camera device, comprising:
capturing an original rearward image having a point of view behind a vehicle obtained from a rearward wide field of view camera device positioned proximate to a rearward end of the vehicle;
outputting the original rearward image obtained from the camera device to a camera calibration module;
monitoring intrinsic calibration information for the camera device comprising focal length parameters for the camera device and optimal center parameters for the camera device;
monitoring radial distortion parameters for the camera device;
monitoring extrinsic information for the camera device comprising positional parameters and orientation parameters;
monitoring vehicle information comprising vehicle speed, orientation and steering angle parameters;
monitoring a set of predetermined cropping parameters capable of being dynamically updated, wherein the cropping parameters are configured to reduce at least one of a portion of the original image along a first axis corresponding to an image width and a portion of the original image along a second axis orthogonal to the first axis and corresponding to an image height;
generating the rectangularly cropped image within a dynamic registration module of the camera calibration module, the rectangularly cropped image based on the monitored set of predetermined cropping parameters to exclude undesirable content from the original image, the monitored predetermined cropping parameters configured to reduce a portion of the original rearward image, such that the cropped image corresponds to the area of the original image bound within the monitored rectangular cropping parameters;

updating the intrinsic calibration information within an adjustment module of the camera calibration module, wherein updating the intrinsic calibration information is based on a mathematical relationship to the monitored predetermined cropping parameters, such that the graphic can be dynamically registered upon the rectangularly cropped image based on accurately calibrated intrinsic calibration information including focal length parameters, comprising updating a first focal length parameter to the first axis based on a mathematical relationship between the first focal length parameter and said monitored predetermined cropping parameters configured to reduce the portion of the original image along the first axis corresponding to the image width, and updating a second focal length parameter perpendicular to the second axis based on a mathematical relationship between the second focal length parameter and said monitored predetermined cropping parameters configured to reduce the portion of the original image along the second axis corresponding to the image height, updating a first optical center parameter along the first axis based on a mathematical relationship between the first optical center parameter and said monitored predetermined cropping parameters configured to reduce the portion of the original image along the first axis corresponding to the image width, and updating a second optical center parameter along the second axis based on a mathematical relationship between the second optical center parameter and said monitored predetermined cropping parameters configured to reduce the portion of the original image along the second axis corresponding to the image height, wherein the second optical center parameter is updated in accordance with the following relationship:

$$v0_{updated} = \left(\frac{\frac{v0}{imgH} - a\%}{1 - a\% - b\%}\right) \times imgH$$

wherein $V0_{updated}$ is the second optical center parameter,

V0 is the second optical center parameter, and imgH is the image height;

dynamically registering the graphic upon the rectangularly cropped image within the dynamic registration module, the dynamic registering based on the adjusted intrinsic calibration information for the camera device, the monitored radial distortion parameters for the camera device, the monitored extrinsic information for the camera device and the monitored vehicle information; and displaying the rectangularly cropped image and the dynamically registered graphic upon the cropped image upon a graphic projection display, said graphic projection display comprising one of a touch screen display, a human machine interface display, a rear-view mirror display, a side-view mirror display and a display monitor.

21. Method for dynamically registering a graphic upon a rectangularly cropped image obtained from a camera device, comprising:

capturing an original image obtained from the camera device;

outputting the original image obtained from the camera device to a camera calibration module;

monitoring intrinsic calibration information for the camera device including focal length parameters for the camera device, extrinsic information for the camera device, radial distortion parameters for the camera device, and vehicle information;

monitoring a set of cropping parameters capable of being dynamically updated, wherein the cropping parameters are configured to reduce at least one of a portion of the original image along a first axis corresponding to an image width and a portion of the original image along a second axis orthogonal to the first axis and corresponding to an image height;

generating the rectangularly cropped image within a dynamic registration module of the camera calibration module, the rectangularly cropped image based on the monitored cropping parameters to exclude undesirable content from the original image, such that the cropped image corresponds to the area of the original image bound within the monitored rectangular cropping parameters;

adjusting the intrinsic calibration information within an adjustment module of the camera calibration module, wherein adjusting the intrinsic calibration information is based on a mathematical relationship to the cropping parameters, in response to the monitored cropping parameters being dynamically updated, such that the graphic can be accurately dynamically registered upon the rectangularly cropped image, said adjusting the intrinsic calibration information comprising:

updating a first focal length parameter perpendicular to the first axis based on a mathematical relationship between the first focal length parameter and the cropping parameters configured to reduce the portion of the original image along the first axis corresponding to the image width;

updating a second focal length parameter perpendicular to the second axis based on a mathematical relationship between the second focal length parameter and the cropping parameters configured to reduce the portion of the original image along the second axis corresponding to the image height, wherein the second focal length parameter is updated in accordance with the following relationship:

$$fv_{updated} = \frac{fv}{1 - a\% - b\%}$$

wherein $fV_{updated}$ is the updated second focal length parameter, fv is the second focal length parameter, and a and b are cropping parameters corresponding to image height;

dynamically registering the graphic upon the rectangularly cropped image within the dynamic registration module, the dynamic registering based on the adjusted intrinsic calibration information for the camera device including the updated first focal length parameter and the updated second focal length parameter, the monitored extrinsic information for the camera device, the monitored radial distortion parameters for the camera device and the monitored vehicle information; and displaying the rectangularly cropped image and the dynamically registered graphic upon the cropped image upon a graphic projection display.

* * * * *